United States Patent [19]

Ricciardelli et al.

[11] Patent Number: 4,579,568
[45] Date of Patent: Apr. 1, 1986

[54] GAS ANALYZER SEPARATOR

[75] Inventors: Robert H. Ricciardelli, Waukesha; Roger W. Blazel, Milwaukee, both of Wis.

[73] Assignee: Biochem International Inc., Waukesha, Wis.

[21] Appl. No.: 540,804

[22] Filed: Oct. 11, 1983

[51] Int. Cl.[4] .............................................. B01D 19/00
[52] U.S. Cl. .................................... 155/189; 55/204; 128/719; 128/730
[58] Field of Search ............... 128/719, 730, 718, 716; 55/185, 189, 192, 204, 257 PR

[56] References Cited

U.S. PATENT DOCUMENTS

| | | | |
|---|---|---|---|
| 1,442,785 | 1/1923 | Scheminger | 55/434 |
| 2,195,898 | 4/1940 | Newton . | |
| 3,236,188 | 2/1966 | Eves et al. . | |
| 3,243,941 | 4/1966 | Peterson | 55/204 |
| 3,692,437 | 9/1972 | Ray . | |
| 3,895,927 | 7/1975 | Bournham . | |
| 4,018,579 | 4/1977 | Hofmann . | |
| 4,026,685 | 5/1977 | Grix . | |
| 4,047,909 | 9/1977 | Hofmann . | |
| 4,182,136 | 1/1980 | Morse | 55/192 X |
| 4,197,858 | 4/1980 | Osborn . | |
| 4,304,578 | 12/1981 | Hakala et al. | 55/189 |
| 4,335,574 | 6/1982 | Sato et al. . | |
| 4,413,632 | 11/1983 | Schlessinger et al. . | |
| 4,446,869 | 5/1984 | Knodle . | |
| 4,475,932 | 10/1984 | Hull et al. | 55/204 X |
| 4,476,708 | 10/1984 | Baker et al. . | |
| 4,483,697 | 11/1984 | Deysson et al. | 55/204 X |

Primary Examiner—Charles Hart
Attorney, Agent, or Firm—Willian Brinks Olds Hofer Gilson & Lione Ltd.

[57] ABSTRACT

A gas/liquid separator for a gas analyzer is described. The separator includes a separator chamber made up of two component chambers. The first of these component chambers is relatively shallow in depth and serves to connect an input port with a lower output port. The second of these two component chambers is less shallow in depth and serves to interconnect the lower output port with the upper output port. This second component chamber is bounded by two diverging surfaces which diverge in the direction of the upper output port. A barrier extends into the separator chamber to separate the input port from the upper output port and to prevent the flow of liquid directly from the input port to the output port.

12 Claims, 7 Drawing Figures

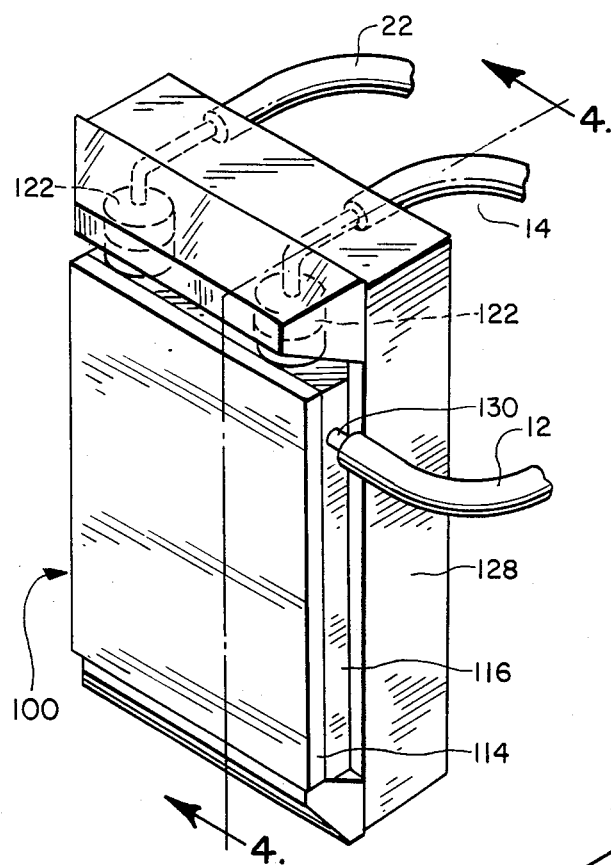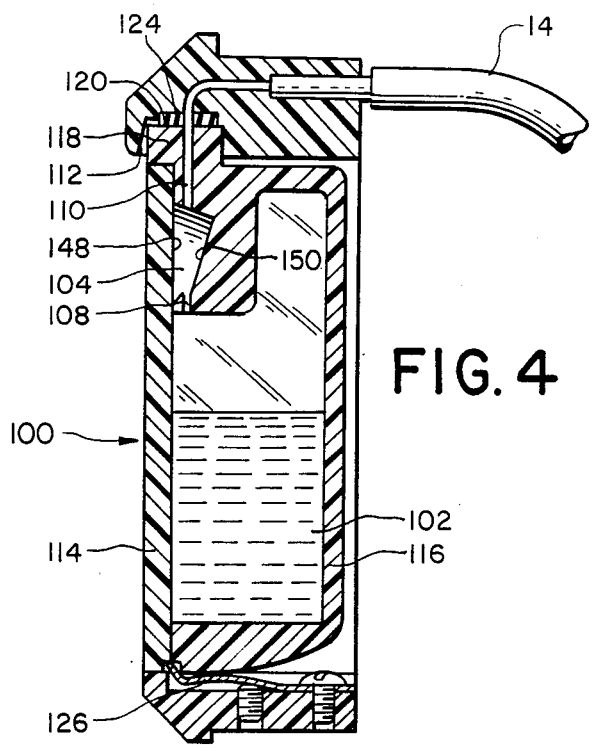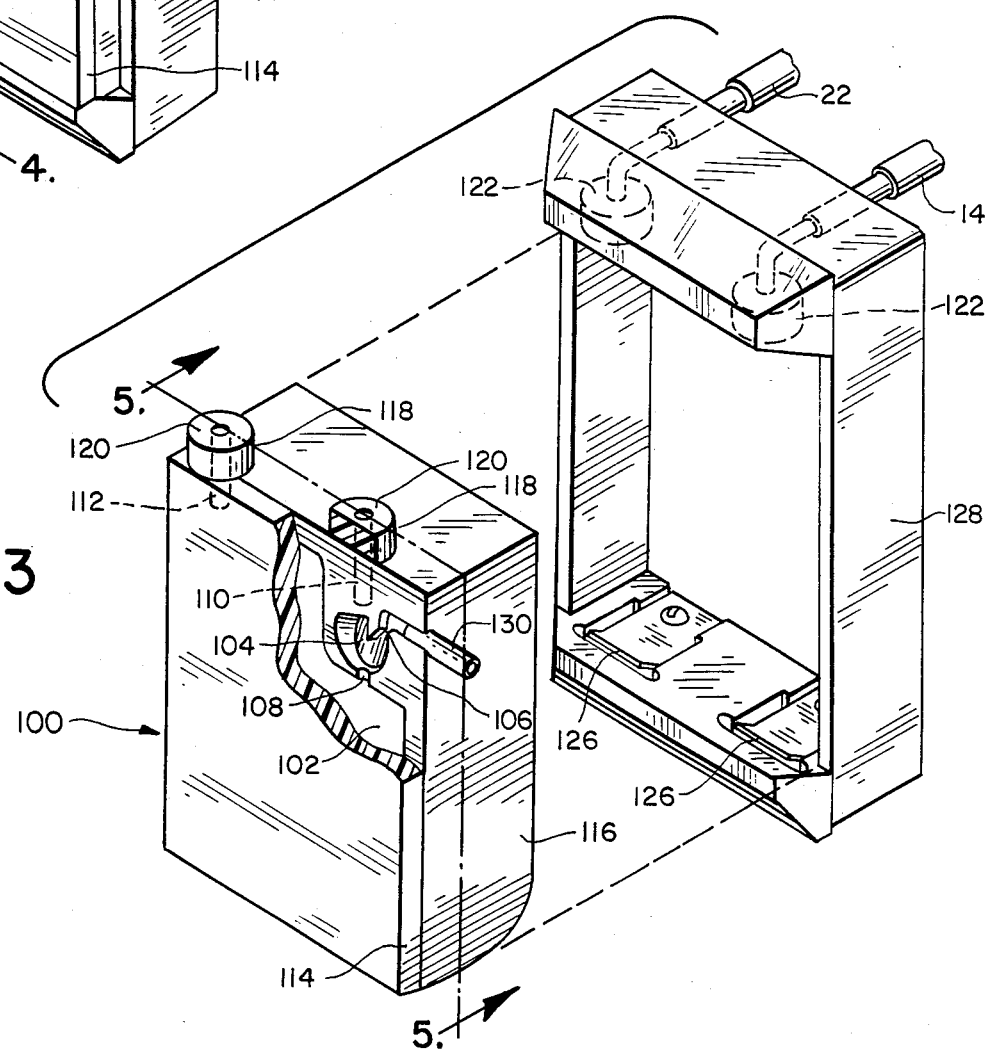

GAS ANALYZER SEPARATOR

BACKGROUND OF THE INVENTION

The present invention relates to an improved gas/liquid separator for a gas analyzer of the type used to analyze gases exhaled by a patient.

In the past, gas analyzers have been used to monitor the composition of gases exhaled by a patient. For example, $CO_2$ concentration can be used to monitor the physiology of a patient, as for example during a surgical procedure. It has been recognized for some time that a gas/liquid separator is needed to remove liquids exhaled by the patient to prevent these liquids from entering the gas analyzer. U.S. Pat. No. 4,304,578 to Hakala et al discloses one such prior art water separator for a gas analyzer.

However, this separator of the prior art is not without its disadvantages. In particular, when the water content of the fluid entering the separator exceeds the capacity of the separator, the separator can pass liquid to the gas analyzer. When this happens, optical components of the gas analyzer can be fouled, thereby interrupting the operation of the gas analyzer. Typically, when liquid enters the gas analyzer the analyzer must be taken off line and cleaned before it is again capable of providing reliable measurements of gas content.

A need presently exists for an improved water separator for use with such gas analyzers, which provides improved separation of water, which is simple and inexpensive to manufacture from materials such as suitable plastics, and which passes the sample through the separator with a minimum of turbulence and mixing.

SUMMARY OF THE INVENTION

The present invention is directed to an improved gas/liquid separator for a gas analyzer which has been found to provide particularly good air/water separation, and which is inexpensive to fabricate. In certain preferred embodiments, this separator lends itself to use in a one-piece disposable unit.

According to this invention, a liquid separator for a gas analyzer for analyzing gases exhaled by a patient is provided. This separator includes a separator chamber comprising first and second chambers disposed on either side of a barrier which projects partially into the separator chamber such that the first and second chambers are in fluid communication around the barrier. An input port is positioned to introduce gas and liquid into an upper portion of the first chamber, and a lower output port is positioned to remove liquid and gas from a lower portion of the separator chamber. In addition, an upper output port is positioned to remove gas from an upper portion of the second chamber. The barrier is disposed between the input port and the upper output port to impede the flow of liquid from the input port to the upper output port. In the preferred embodiment described below, the cross-sectional area of the second chamber increases in the direction of the upper output port and the input port is positioned to introduce gas and liquid into the first chamber tangentially with respect to an outer surface of the first chamber. In this preferred embodiment, the depth of the first chamber adjacent the input port is less than the depth of the second chamber adjacent the output port in order to minimize the flow of liquid out of the upper output port.

As will be described in detail below, the separator of this invention operates to remove liquid such as water efficiently from an incoming sample and to minimize the transfer of water out of the upper output port. The separator of this invention has been found to provide excellent water separation, even at high water content levels of the incoming sample and even at low flow rates. The construction of the separator of this invention is well adapted to be fabricated from molded plastic, and it can be formed as an integral part of a container which serves to contain liquid removed from the incoming sample by the separator. In this way a particularly simple, low-cost and reliable one-piece separator/container unit can be provided to eliminate the need to clean and sterilize the separator between uses.

The invention itself, together with further objects and attendant advantages, will best be understood by reference to the following detailed description, taken in conjunction with the accompanying drawings.

BRIEF DESCRIPTION OF THE DRAWINGS

FIG. 2 is a perspective view showing the gas/liquid separator of FIG. 1 as mounted in the analyzer.

FIG. 3 is an exploded view in partial cutaway of the structure of FIG. 2.

FIG. 4 is a sectional view taken along line 4—4 of FIG. 2.

DETAILED DESCRIPTION OF THE PRESENTLY PREFERRED EMBODIMENTS

Figure 1:
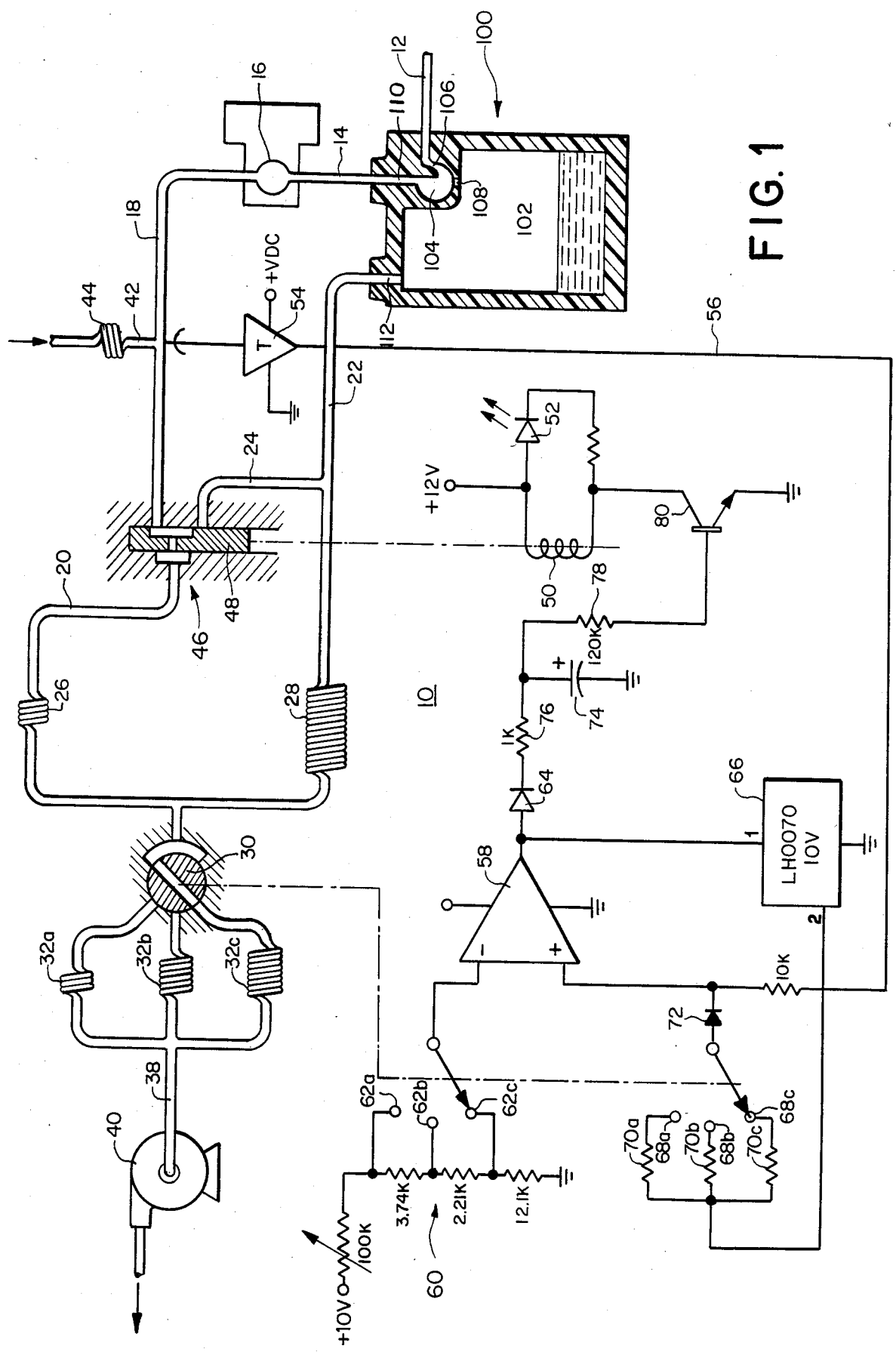
FIG. 1 is a schematic diagram of portions of a gas analyzer adapted for use with a presently preferred embodiment of the separator of this invention.

Turning now to the drawings, FIG. 1 shows a schematic view of portions of a gas analyzer 10 suitable for use with the presently preferred embodiment of this invention. The analyzer 10 forms no part of the present invention, but is disclosed in greater detail and claimed in a co-pending application assigned to the assignee of the present invention. The analyzer 10 is described here merely to aid understanding of the operation of the separator 100.

As shown in FIG. 1, the gas analyzer 10 includes a sample input conduit 12 which is coupled to a gas/liquid separator 100. The input conduit 12 serves to pass a sample from a patient to the separator 100. In this preferred embodiment, the input conduit is 5 feet in length, is formed of a flexible plastic material, and is provided with an inside diameter of 0.040 inches.

The gas analyzer 10 also includes a sample chamber 16 which is connected to the separator 100 by a conduit 14. The analyzer 10 includes means (not shown) for analyzing the $CO_2$ content of gas in the sample chamber 16. A wide variety of infrared absorption systems can be used to detect $CO_2$ optically, such as the systems used in the gas analyzers marketed by Puritan Bennett or Biochem International Inc.

Gas which passes out of the sample chamber 16 passes via a conduit 18 to a valve 46 which will be described in greater detail below. Gas flows from the valve 46 via a conduit 20 and a flow restrictor 26 to a flow selector 30. The flow selector 30 has three positions and operates to direct the gas from the restrictor 26 to one of the three flow restrictors 32a,32b,32c. These three flow restrictors 32a,32b,32c are connected in parallel to a conduit 38 which is in turn connected to a vacuum pump 40. In addition, the flow selector 30 receives gas directly from the separator 100 via the conduit 22 and the flow restrictor 28. A conduit 24 is provided interconnecting the conduit 22 and the valve 46. In addition, a vent conduit 42 is connected to the conduit 18 by means of yet another flow restrictor 44.

Each of the flow restrictors 26, 28, 32a, 32b, 32c and 44 is formed of an appropriate length of tubing of 0.010 inches in internal diameter. The three flow restrictors 32a, 32b and 32c are provided with a length appropriate to cause the gas flow through the flow selector 30 to equal 150 cc per minute when the restrictor 32a is selected, 75 cc per minute when the restrictor 32b is selected, and 25 cc per minute when the restrictor 32c is selected. The restrictor 28 is 6 feet in length and the restrictor 26 is 2 inches in length such that the fluid flow through the conduit 20 is about 14 times the fluid flow through the conduit 22. The restrictor 44 is 3 feet in length.

The valve 46 is a solenoid valve which is controlled by current through a coil 50. Depending on the presence or absence of current in the coil 50, a valve member 48 included in the solenoid valve 46 is positioned to block either the conduit 24 or the conduit 18. The solenoid valve 46 operates to block the conduit 24 in the absence of current through the coil 50. Merely by way of example, the solenoid valve 46 can be of the type marketed by Clippard as Model No. EVO-3. An LED 52 is connected in parallel with the coil 50 to provide a visual indication of when the solenoid valve 46 is energized to block the conduit 18 and provide an interconnection between the conduit 24 and the conduit 20.

The gas analyzer 10 includes a pressure transducer or sensor 54 which operates to generate an electrical signal on line 56 which is indicative of the pressure of the fluid in the conduit 18. Purely by way of example, the transducer 54 may be of the type distributed by Microswitch as Model No. 141PC06D. This transducer 54 produces a voltage on line 56 which varies in inverse proportion to the pressure in the conduit 18. Thus, the lower the pressure in the conduit 18, the higher the voltage on line 56. The voltage on line 56 is in effect a pressure signal which is applied to the noninverting input of a comparator 58. The inverting input of the comparator 58 is connected to one of three terminals 62a, 62b, 62c of a voltage divider 60.

One of three reference voltages is applied to the comparator 58 by the voltage divider 60, in accordance with which of the terminals 62a,62b,62c is utilized. The output of the comparator 58 is applied as an input to a voltage regulator 66. This voltage regulator 66 operates to generate a 10 volt output voltage whenever the output of the comparator 58 is high. The output voltage of the voltage regulator 66 is applied in parallel to three resistors 70a,70b,70c. Three terminals 68a,68b,68c are provided, each connected to a respective one of the resistors 70a,70b,70c. Any one of these three terminals 68a,68b,68c can be connected via a diode 72 to the noninverting input of the comparator 58.

The three restrictors 32a,32b,32c, the three terminals 62a,62b,62c and the three terminals 68a,68b,68c are switched in a coordinated manner. For example, when the flow restrictor 32a is selected to provide a 150 cc per minute flow rate through the flow selector 30, the terminal 62a is selected to provide an appropriate reference voltage for the comparator 58, and the terminal 68a is selected to provide an appropriate hysteresis voltage for the comparator 58. Thus, when the flow selector 30 is used to choose any one of the three restrictors 32a,32b,32c in accordance with the desired fluid flow rate, both the threshold voltage to the comparator 58 and the hysteresis voltage to the comparator 58 are automatically adjusted to the appropriate value.

The output signal of the comparator 58 also charges a capacitor 74 via a diode 64 and a resistor 76. Once the capacitor 74 is charged, current passes via the resistor 78 to turn on the transistor 80, thereby energizing the coil 50 and switching the solenoid valve 46 to block flow through the conduit 18. The resistor 76 is a 1K resistor, and the resistor 78 is a 120K resistor. This choice of resistances causes the capacitor 76 to charge quickly but to discharge slowly through the transistor 80. In this way, the transistor 80 is maintained in the conducting condition for approximately 1 second after the output of the comparator 58 falls to the low state. Simply by way of example, the transistor 80 can be of the type 2N3417, the comparator 58 can be type LM358, and the voltage regulator 66 can be type LH0070.

Turning now to FIGS. 2–7, the separator 100 is a single, integral unit which defines both a collection chamber 102 and a separator chamber 104. The separator chamber 104 is provided with an input port 106, a lower output port 108, and an upper output port 110. The collection chamber 102 is provided with a suction port 112. As best seen in FIG. 2, the input port 106 is connected to the sample input conduit 12 to receive the fluid sample from a patient. The lower output port 108 is defined at the lowermost portion of the separator chamber 104 and serves to interconnect the separator chamber 104 and the collection chamber 102. The upper output port 110 is situated at the uppermost portion of the separator chamber 104 and is connected to the conduit 14 to supply gas to the sample chamber 16. The suction port 112 is connected via the conduit 22 to the restrictor 28 and the flow selector 30.

In this preferred embodiment the separator 100 is formed of two pieces of suitable plastic, such as Plexiglas: a body 116 and a cover plate 114. The body 116 defines the collection chamber 102, the separator chamber 104 and the ports 106,108,110,112. The cover plate 114 is a flat plastic plate which is securely bonded to the body 116 to enclose the collection chamber 102 and the separator chamber 104. Any suitable bonding technique can be used to join the body 116 and the cover plate 114. Epoxy cements, solvent-type cements, or ultrasonic welding techniques can be used. Whatever the method used, the junction between the body 116 and the cover plate 114 should be leakproof and secure in the presence of water and 100% humidity.

As shown in FIGS. 2-6, the body 116 defines two sealing lugs 118 around the upper output port 110 and the suction port 112. Each of these lugs 118 defines a respective sealing surface 120.

The separator 100 is sized to fit within a receiving well 128 in the analyzer 10. This receiving well 128 defines two spaced wells 122 sized to receive the lugs 118. Each of the wells 122 includes a respective gasket 124 which operates to generate a gas-tight seal against the sealing surface 120 of the respective lug 118. The wells 122 serve to interconnect the conduits 14,22 with the upper output port 110 and suction port 112, respectively. Springs 126 are provided at the lower portion of the receiving well 128 to bias the separator 100 upwardly in order to ensure a firm, airtight seal between the gaskets 124 and the sealing surfaces 120. A metal tube 130 extends out of the input port 106 and serves to interconnect the input port 106 with the input conduit 12.

Figure 5:
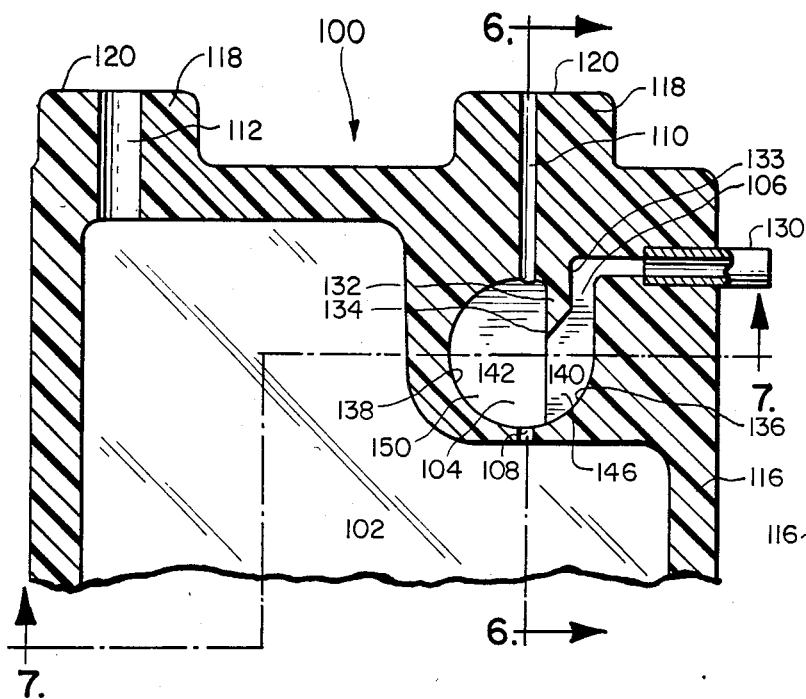
FIG. 5 is a partial sectional view taken along line 5—5 of FIG. 3.

As best shown in FIGS. 3–7, the separator chamber 104 is defined in part by a barrier 132 which is situated between the input port 106 and the upper output port 110. This barrier 132 extends partially into the separator chamber 104 and terminates in a sharp edge 134. The peripheral walls of the separator chamber 104 include a first wall 136 which extends between the input port 106 and the lower output port 108, and a second wall 138 which extends between the upper output port 110 and the lower output port 108. As shown in FIG. 5, both the first and second walls 136,138 are concave in this preferred embodiment.

Figure 6:
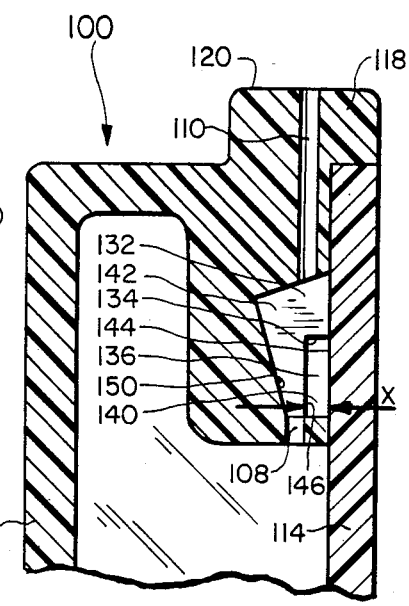
FIG. 6 is a partial sectional view taken along line 6—6 of FIG. 5.
Figure 7:
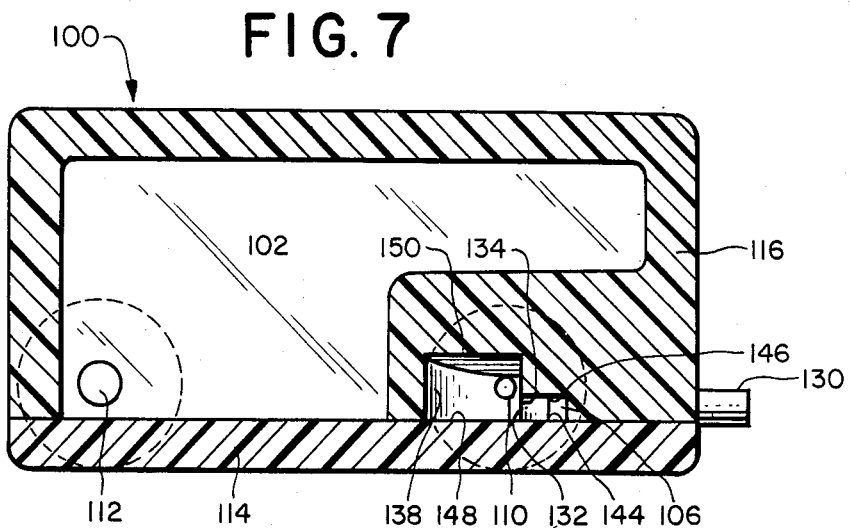
FIG. 7 is a sectional view taken along line 7—7 of FIG. 5.

The separator chamber 104 is made up of two component chambers 140,142, the first chamber 140 extends generally between the input port 106 and the lower output port 108, and is bounded by a front face 144 and a back face 146, both of which intersect the first wall 136. As shown in FIG. 6, the front and back faces 144,146 of the first chamber 140 of this preferred embodiment are parallel and spaced apart by a small distance x which represents the depth of the first chamber 140. In this preferred embodiment, this depth x is in the range 0.035–0.045 inches. Most preferably, the depth x is approximately equal to 0.045 inches.

The second chamber 142, which is generally to the left of the barrier 132 as shown in FIG. 5, extends between the upper output port 110 and the lower output port 108 adjacent to the second wall 138. As shown in FIG. 4, the major portion of the chamber 142 is bounded by a front face 148 and a back face 150. The front face 148 is a continuation of the front face 144, and both the faces 144,148 are coplanar and formed by the cover plate 114. However, the back face 150 of the second chamber 142 diverges from the front face 148 in the direction of the upper output port 110. Thus, the depth and the cross-sectional area of the second chamber 142 increase in the direction of the upper output port 110. As shown in FIG. 6, the depth of the second chamber 142 is in all places greater than the depth of the first chamber 140. Also, it should be noted that the input port 106 serves to direct the gas/liquid sample tangentially into the first chamber 140, along the surface of the first wall 136.

Purely by way of example, the following elements are provided with the following dimensions in this embodiment. The radius of curvature of the first and second walls 136,138 is 0.050 inches. The input port 106 is 0.045 inches by 0.045 inches. The width of the lower output port 108 is 0.045 inches. The angle of the apex of the barrier 132 is 45°. The diameter of the upper output port 110 is 0.045 inches. The distance between the axes of the upper output port 110 and the input port 106 is 0.125 inches. The capacity of the collection chamber is 20 cc.

In use, the separator chamber 104 has been found to provide efficient and effective separation of liquid from gas. Various portions of the geometry of the separator chamber 104 contribute to this result. The barrier 132 serves to prevent liquid from moving directly from the input port 106 to the upper output port 110. Liquid tends to follow the surface of the barrier 132 to the edge 134 where it falls off the barrier 132 downwardly, toward the lower output port 108. Another portion of the liquid included in the sample follows the first wall 136 toward the lower output port 108. The relatively small depth of the first chamber 140 ensures that fluid flow velocity in the first chamber 140 remains relatively high, thereby providing an effective force tending to push liquid in the direction of the lower output port 108. Liquid which reaches the vicinity of the lower output port 108 is pulled into the collection chamber 102 by the low pressure maintained in the collection chamber 102 by virtue of the suction port 112. Preferably, the surface 133 of the barrier 132 is provided with a concave shape in order to enhance adhesion of liquid to this surface.

It is also believed important to the functioning of this preferred embodiment that the second chamber 142 has an increased cross-sectional area as compared with the first chamber 140 and a depth which increases in the direction of the upper output port 110. Any bubbles which reach the second chamber 142 tend to remain in the shallower, lower portion of the second chamber 142. If such bubbles are forced upwardly toward the upper output port 110, their cross-sectional area is increased, and they tend to burst. Thus, the configuration of the first and second chambers 140,142 cooperates with the location and orientation of the ports 106,108,110 and the barrier 132 to substantially prevent the flow of liquid out of the upper output port 110 and to ensure that under normal operating conditions liquid contained in the sample introduced via the input port 106 flows via the lower output port 108 to the collection chamber 102.

From the foregoing, it should be apparent that the preferred embodiment described above provides important advantages. The separator 100 is a simple, low-cost, one-piece unit which can easily and simply be removed and replaced when necessary. Because the separator chamber 104 is formed integrally with the collection chamber 102, the entire unit (including perhaps the input conduit 12) can be used once and then discarded. The separator chamber 104 is particularly simple and economical to manufacture in readily available plastics such that the entire separator 100 can be made as a low cost, disposable unit. The separator chamber 104 has been designed to separate water from air effectively over a wide range of flow rates. Furthermore, the separator chamber 104 has been found to work effectively even when the water component of the sample exceeds 20% of the total sample by volume. The use of the lugs 118 and the receiving wells 128 allows the entire separator 100 to be installed in and removed from the analyzer 10 simply and quickly, without cumbersome screw connections or the like. The separator can be made as described above with a minimum of dead space to maximize response time and minimize mixing problems.

Preferably, the collection chamber 102 is made of a transparent plastic to allow a user to monitor the amount of liquid in the collection chamber 102. In this way, the separator 100 can be replaced before the collection chamber 102 becomes filled with liquid.

Of course, it should be understood that a wide range of changes and modifications to the preferred embodiment described above will be apparent to those skilled in the art. For example, the separator chamber 104 described above can be used in conjunction with a detachable collection chamber 102 if desired, and the separator 100 can be used in gas analyzers which do not incorporate the protection system described above. In addition, dimensions and materials can be modified as desired to suit the intended application. It is therefore intended that the foregoing detailed description be regarded as illustrative rather than limiting, and that it be understood that it is the following claims, including all equivalents, which are intended to define the scope of this invention.

We claim:

1. A liquid separator for a gas analyzer for analyzing gases exhaled by a patient, said separator comprising:

means for defining a separation chamber having an input port, a lower output port, an upper output port, and a first concave wall extending between the input port and the lower output port;

a barrier which extends partially into the separation chamber between the input port and the upper output port to define a first chamber, included in the separation chamber and disposed between the input port and the lower output port, and a second chamber, also included in the separation chamber and disposed between the upper and lower output ports; and means for collecting fluids which pass through the lower output port, said collecting means comprising a suction port;

said input port oriented to direct incoming fluids tangentially along the first wall toward the lower output port;

said second chamber having a depth which increases in the direction of the upper output port;

said first chamber having a depth less than that of at least a portion of the second chamber;

said first and second chambers, barrier, and ports cooperating to separate gas from liquid introduced via the input port into the separation chamber in order to reduce the passage of liquid through the upper output port.

2. The invention of claim 1 wherein said first and second chambers each define a respective average depth measured substantially perpendicular to the flow through the chamber, the depth of the first chamber being less than the depth of the second chamber.

3. The invention of claim 1 wherein the barrier terminates in the separation chamber in a sharp edge.

4. The invention of claim 1 wherein the separation chamber is bounded by a second wall extending between the upper and lower output ports, and wherein said second wall is concave.

5. The invention of claim 1 wherein the first chamber is bounded by two spaced parallel surfaces oriented to intersect the first wall.

6. The invention of claim 5 wherein the two spaced parallel surfaces are separated by a distance greater than about 0.035 inches and no more than about 0.045 inches.

7. The invention of claim 1 wherein the second chamber is bounded by two diverging surfaces oriented to intersect the second wall, wherein the separation between the two diverging surfaces increases in the direction of the upper output port.

8. The invention of claim 1 wherein the separation chamber, the barrier and the collecting means form an integral, disposable unit.

9. The invention of claim 1 further comprising first and second sealing lugs, each positioned to surround a respective one of the upper output port and the suction port, each sealing lug defining a respective sealing surface around the respective port.

10. An integral, disposable liquid separator/container for a gas analyzer for analyzing gases exhaled by a patient, said separator/container comprising:

a container;

a suction port defined in a first upper portion of the container;

a separator formed as an integral part of the container adjacent a second upper portion of the container, said separator comprising:

a separation chamber bounded by first and second concave walls;

a lower output port interconnecting a lower portion of the separation chamber with the container and disposed between the first and second concave walls;

an intake port positioned to introduce a gas/liquid mixture tangentially along the first concave wall toward the lower output port;

an upper output port positioned to remove gas from the separation chamber, said upper output port positioned at an upper portion of the second concave wall;

a barrier wall extending partially into the separation chamber between the input port and the upper output port, said barrier wall terminating in a sharp edge and dividing the separation chamber into a first zone, adjacent to the first concave wall and extending between the input port and the lower output port, and a second zone, adjacent to the second concave wall and extending between the lower and upper output ports;

said first zone bounded by two spaced parallel surfaces which intersect the first concave wall and are separated by a first distance;

said second zone bounded by two divergent surfaces which intersect the second concave wall, which diverge in the direction of the upper output port, and which are separated by a distance greater than the first distance.

11. The invention of claim 10 wherein the first distance is in the range of about 0.035-0.045 inches.

12. The invention of claim 10 wherein the suction port and the upper output port terminate in sealing lugs which define respective sealing surfaces.

* * * * *